(12) United States Patent
Amemiya et al.

(10) Patent No.: US 7,606,003 B2
(45) Date of Patent: Oct. 20, 2009

(54) ELECTRICAL DEVICE FOR INTERCONNECTING MAGNETIC HEAD AND DRIVING CIRCUIT WHICH USES ADJUSTED LENGTH WIRES OF OPPOSITE POLARITY TO REDUCE CROSSTALK AND STORAGE APPARATUS INCLUDING SAME

(75) Inventors: Yoshihiro Amemiya, Yokohama (JP); Tetsuyuki Kubota, Yokohama (JP); Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 612 days.

(21) Appl. No.: 11/385,474

(22) Filed: Mar. 21, 2006

(65) Prior Publication Data
US 2007/0115588 A1    May 24, 2007

(30) Foreign Application Priority Data
Nov. 24, 2005    (JP) ............................... 2005-338436

(51) Int. Cl.
*G11B 5/55* (2006.01)
(52) U.S. Cl. .................................... 360/246; 360/245.9
(58) Field of Classification Search ................. 360/246, 360/245.9
See application file for complete search history.

(56) References Cited

U.S. PATENT DOCUMENTS

| | | | | |
|---|---|---|---|---|
| 5,805,382 | A | * | 9/1998 | Lee et al. ................. 360/244.1 |
| 7,271,985 | B1 | * | 9/2007 | Buhler et al. ............ 360/245.9 |

FOREIGN PATENT DOCUMENTS

| | | |
|---|---|---|
| JP | 63-113912 | 5/1988 |
| JP | 02-033612 | 2/1990 |
| JP | 05-258527 | 10/1993 |
| JP | 2001-044372 | 2/2001 |

* cited by examiner

*Primary Examiner*—A. J. Heinz
(74) *Attorney, Agent, or Firm*—Greer, Burns & Crain, Ltd.

(57) ABSTRACT

A storage apparatus and a magnetic head driving device includes a recording/reproducing head including a write element and a magnetoresistive element, a driving circuit for driving the write element and the magnetoresistive element, and write wires and read wires which connect the recording/reproducing head to the driving circuit. The write wires and the read wires are disposed in parallel in at least a portion between the recording/reproducing head and the driving circuit. At a location between the recording/reproducing head and the driving circuit, either of the write wires and the read wires are disposed so that a polarity of the either of the write wires and the read wires is reversed with respect to a polarity of the other of the write wires and the read wires.

8 Claims, 7 Drawing Sheets

ELECTRICAL DEVICE FOR INTERCONNECTING MAGNETIC HEAD AND DRIVING CIRCUIT WHICH USES ADJUSTED LENGTH WIRES OF OPPOSITE POLARITY TO REDUCE CROSSTALK AND STORAGE APPARATUS INCLUDING SAME

BACKGROUND OF THE INVENTION

1. Field of the Invention

The present invention relates to a wiring structure of a magnetic head driving device in a storage apparatus.

2. Description of the Related Art

FIGS. 1A and 1B illustrate crosstalk in a magnetic head driving device of a related storage apparatus.

FIG. 1A is used to give a general description of crosstalk. The influence of crosstalk on a read head during writing will be described from a transmission path structure and a head 52 of a related magnetic head driving device 51.

During writing, electrical current of a write signal flows towards a coil of a write head from an LSI in a driving circuit 59 (preamplifier). At this time, since four wires comprising write wires and read wires must be disposed in a space, which is narrow in a thickness direction of a head arm, between the driving circuit 59 and the head 52, particularly, between the driving circuit 59 and a flexure, the distances between the write wires and the read wires must be small. Moreover, the use of a larger number of wires for other purposes is proposed. Therefore, the distances between the wires tend to become smaller.

Consequently, since the distances between the wires are small, crosstalk electrical current tends to be produced in the read wires due to coupling between the wires resulting from write electrical current flowing through the write wires.

When the wires are disposed between the head 52 and the flexure by using a flexible printed circuit board, the wires are disposed at the narrow flexure, thereby inevitably reducing the distances between the wires. Therefore, reducing the size of the flexure similarly tends to produce crosstalk electrical current.

From a different viewpoint, since, in the head 52, an MR element of the read head is disposed directly below a thin-film coil of the write head, crosstalk electrical current may flow directly to the MR element from the coil or an internal wire in the write head.

In addition, since the write signal of a few tens of mA is produced for writing data, electrical current of a few tens of mA may flow in the read wires due to crosstalk electrical current that is generated during writing. In contrast, an allowable current (withstand pressure) of the MR element is on the order of a few mA. Therefore, even if crosstalk electrical current has a value on the order of a few mA, the crosstalk electrical current has a great influence on the read wires.

In particular, if the crosstalk electrical current flows into the MR element, the MR element may deteriorate or break due to the quantity of electricity.

Further, the MR element is a tunneling magnetoresistive (TMR) element. Accordingly, the influence of crosstalk electrical current on the MR element due to a smaller allowable quantity of electricity of the MR element is an important problem.

FIG. 1B shows the transmission path structure. The transmission path from the preamplifier 59 to the head 52 is defined by disposing at an actuator the preamplifier 59, a read-write/flexible printed circuit board 58 (RW/FPC 58 in the figure), a relay-flexible-printed-circuit-board and read-write/flexible-printed-circuit-board connecting portion 57 (relay-FPC and RW/FPC connecting portion 57 in the figure), a relay flexible printed circuit board body 56 (relay FPC 56 in the figure), a flexure and relay-flexible-printed-circuit-board connecting portion 55 (flexure and relay-FPC connecting portion 55 in the figure), a flexure 54, and the head 52 formed on a slider 53. A relay flexible printed circuit board 60 comprises the flexure and relay-FPC connecting portion 55, the relay FPC body 56, and the flexure and relay-flexible-printed-circuit-board connecting portion 55.

In the related magnetic head driving device 51, when a write electrical current flows to the head 52 from the preamplifier 59, the flow of the electrical current influences a read wire rx disposed close to and parallel with a write wire wy, causing crosstalk electrical current to flow along the read wire rx as it is in the direction of the read head (as indicated by the broken arrow in FIG. 1B). As a result, a load that is equal to or greater than the withstand pressure is applied to the MR element of the read head. This may cause the MR element to break.

In addition, since the read MR element is disposed directly below the write coil, the write wire is closest to one of the poles of the read wire in the head 52. Therefore, a strong crosstalk electrical current is generated in the read wire disposed directly below the write wire. When the polarity of the crosstalk electrical current in the read head is the same as the polarity of the crosstalk between the wires in the transmission path, a larger stress is applied to the MR element due to a synergistic action.

SUMMARY OF THE INVENTION

A storage apparatus and a magnetic head driving device includes a recording/reproducing head including a write element and a magnetoresistive element, a driving circuit for driving the write element and the magnetoresistive element, and write wires and read wires which connect the recording/reproducing head to the driving circuit. The write wires and the read wires are disposed in parallel in at least a portion between the recording/reproducing head and the driving circuit. At a location between the recording/reproducing head and the driving circuit, either of the write wires and the read wires are disposed so that a polarity of the either of the write wires and the read wires is reversed with respect to a polarity of the other of the write wires and the read wires.

By reducing the overall crosstalk electrical current by such a wiring, it is possible to reduce crosstalk electrical current finally flowing into a read element, thereby making it possible to prevent the read element from deteriorating and breaking.

DESCRIPTION OF THE PREFERRED EMBODIMENTS

Figure 6:
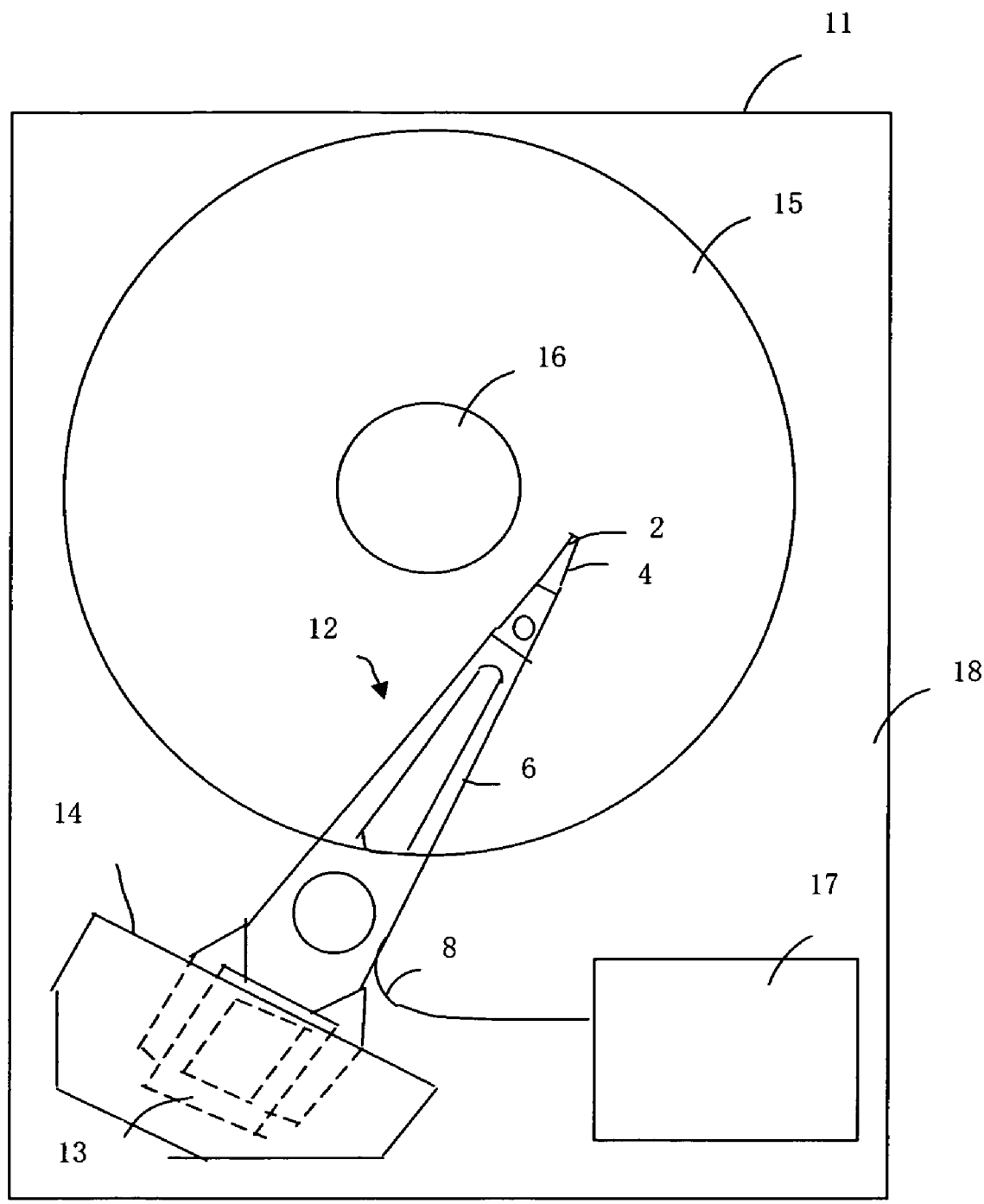
FIG. 6 illustrates a storage apparatus.

FIG. 6 illustrates a storage apparatus.

In a storage apparatus 11, for example, an actuator 12 having a head 2 mounted thereto, an actuator driver 14 including a voice coil motor 13, a spindle motor 16 having a magnetic disc medium 15 mounted thereto, a signal processing substrate having, for example, a hard disc controller disposed thereon are disposed on a base 18.

One end of a read-write/flexible printed circuit board 8 is secured and mounted to a side of the actuator 12, and a preamplifier 9 is disposed on the read-write/flexible printed circuit board 8. The other end of the read-write/flexible printed circuit board 8 is secured to the signal processing substrate through a securing member 17. A portion from the read-write/flexible printed circuit board 8 to a flexure 4 extends along the side of the actuator 12 by a relay flexible printed circuit board 6.

Figure 1A:
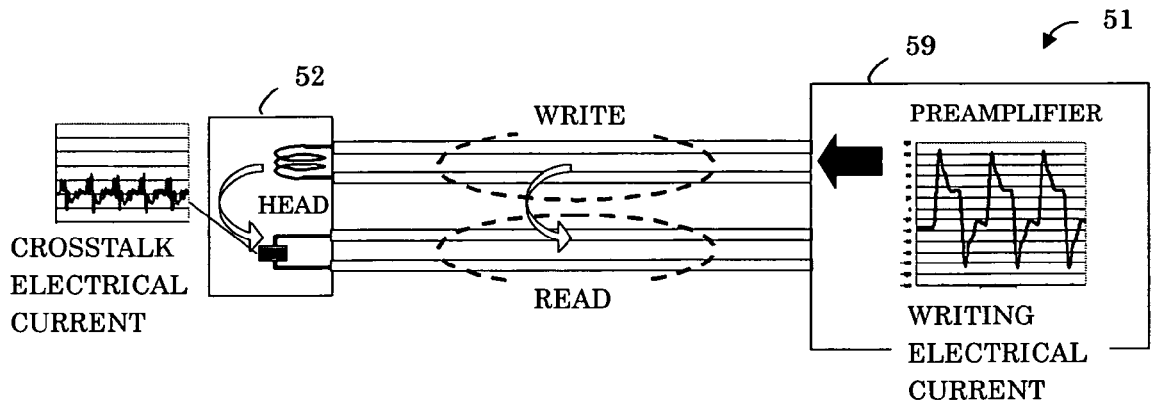
FIGS. 1A and 1B illustrate crosstalk in a related magnetic head driving device, with FIG. 1A illustrating the principle of the crosstalk and FIG. 1B illustrating the structure of the related magnetic head driving device.
Figure 1B:
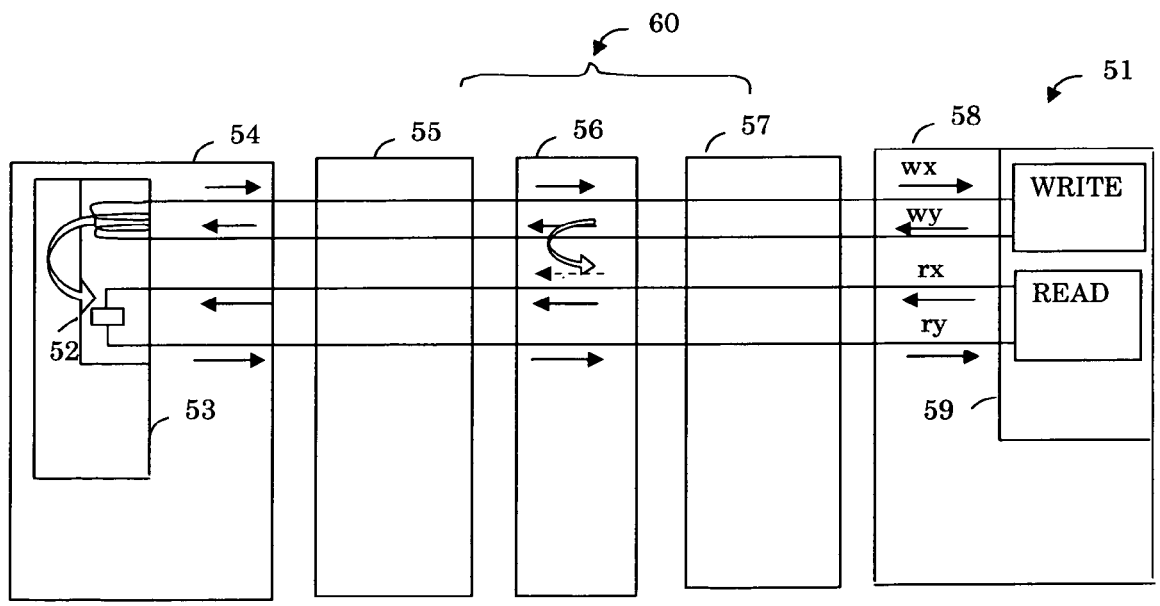
Figure 2A:
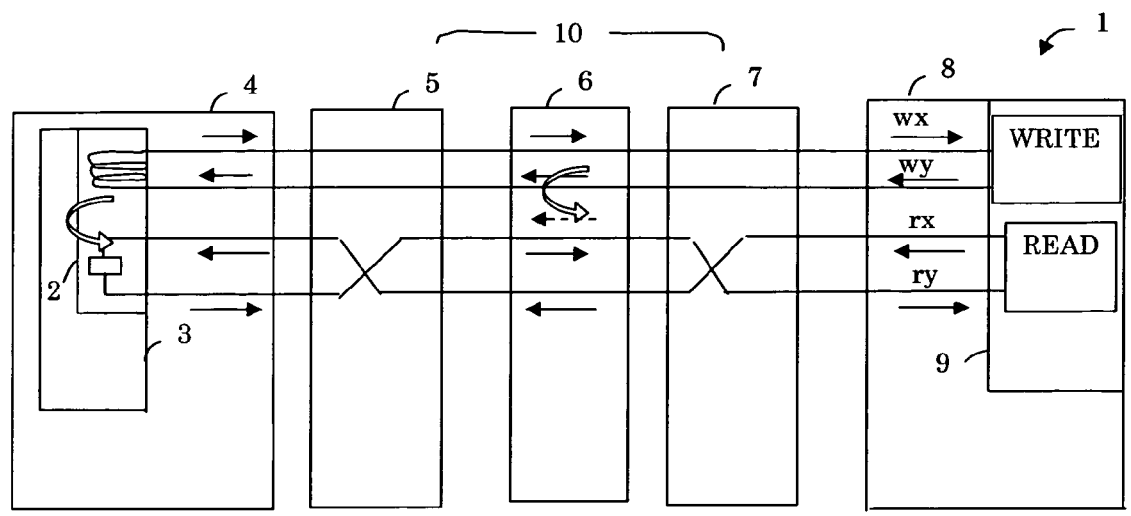
FIGS. 2A and 2B illustrate wiring patterns in a magnetic head driving device according to a first embodiment of the present invention, with FIG. 2A illustrating a read wiring change pattern and FIG. 2B illustrating a write wiring change pattern.
Figure 2B:
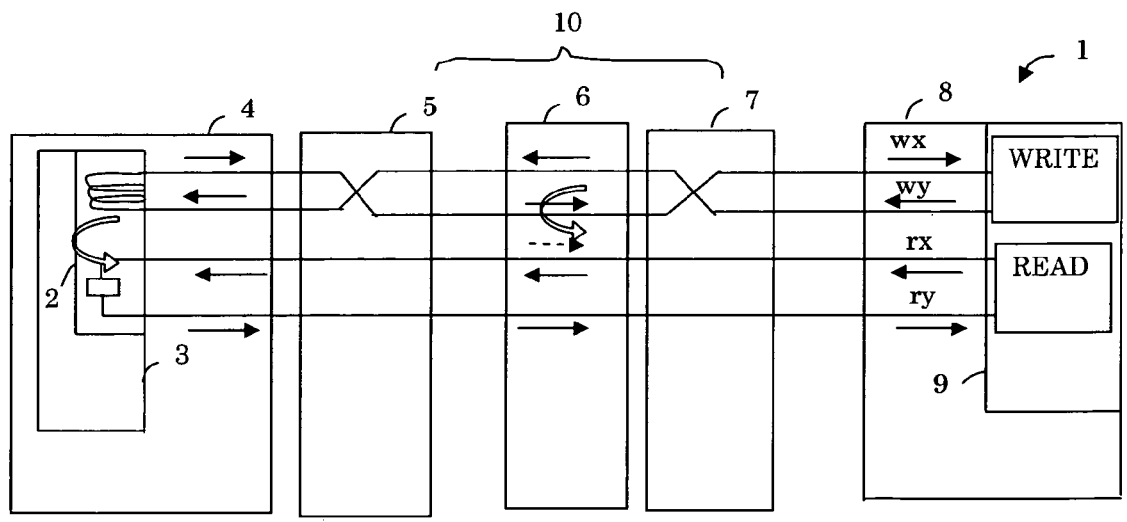

FIGS. 2A and 2B illustrate wiring patterns in a magnetic head driving device according to a first embodiment of the present invention.

A magnetic head driving device 1 for performing a read/write operation on the magnetic disc medium 15 is mounted to the actuator arm 12. The magnetic head driving device 1 has a circuit in which connections by wiring are performed from a slider 3 having the head 2 mounted thereto to the preamplifier 9 on the read-write/flexible printed circuit board 8 (hereafter referred to as "RW/FPC 8") through the flexure 4, a flexure and relay-flexible-printed-circuit-board connecting portion 5 (hereafter referred to as "flexure and relay-FPC connecting portion 5"), the relay flexible printed circuit board body 6 (hereafter referred to as "relay FPC body 6"), and a relay-flexible-printed-circuit-board and read-write/flexible-printed-circuit-board connecting portion 7 (hereafter referred to as "relay-FPC and RW/FPC connecting portion 7").

The head 2 comprises a read element and a write element. The read element is an MR element, such as a TMR element or a GMR element.

The slider 3 is used to mount the head 2 thereto.

The flexure 4 is used to mount the slider 3 and wires thereto.

A relay FPC 10 comprises the relay FPC body 6, the flexure and relay-FPC connecting portion 5, and the relay-FPC and RW/FPC connecting portion 7.

The flexure and relay-FPC connecting portion 5 connects the relay FPC body 6 and the flexure through wires by using connection terminals 31, and includes a pattern of the connection terminals 31 and a pattern of the vicinity of the connection terminals 31.

The relay FPC body 6 is a flexible printed circuit board for relaying a signal between the flexure 4 and the RW/FPC 8 through the flexure and relay-FPC connecting portion 5 and the relay-FPC and RW/FPC connecting portion 7. Write wires and read wires are provided parallel with and adjacent each other. The relay FPC body 6 is formed by a single layer, but may be formed by a plurality of layers.

The relay-FPC and RW/FPC connecting portion 7 connects the relay FPC body 6 and the RW/FPC 8 through the wires by using connection terminals 31, and includes a pattern of the connection terminals 31 and a pattern of the vicinity of the connection terminals 31.

The RW/FPC 8 has the read/write preamplifier 9 for the head 2 mounted thereto, and is connected to the signal processing substrate through the securing member 17.

The preamplifier (driving circuit) 9 includes a read amplifier section for reproduction and a write driver for recording data.

Symbols wx and wy represent a first write wire and a second write wire, respectively. Symbols rx and ry represent a first read wire and a second read wire, respectively. The arrows indicate the directions of electrical current flow.

FIG. 2A illustrates a read wiring change pattern.

In a first method for reducing cross talk, at the flexure and relay-FPC connecting portion 5 and the relay-FPC and RW/FPC connecting portion 7, the read wires are provided so as to change the polarity of the read wires. Therefore, the polarity of a read signal at the relay FPC 10 is reversed with respect to the polarity of a read signal at the other portions.

FIG. 2B illustrates a write wiring change pattern.

In a second method for reducing cross talk, at the flexure and relay-FPC connecting portion 5 and the relay-FPC and RW/FPC connecting portion 7, the write wires are provided so as to change the polarity of the write wires. Therefore, the polarity of the read signal at the relay FPC 10 is reversed with respect to the polarity of the read signal at the other portions.

Figure 3A:
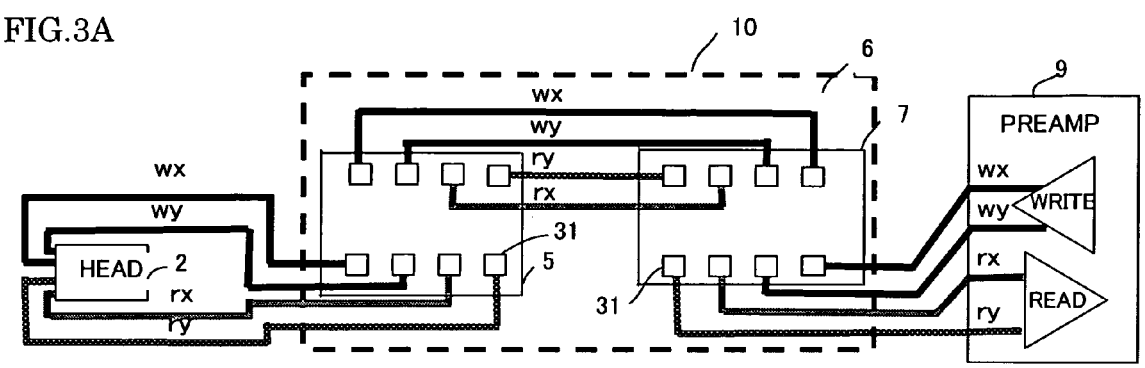
FIGS. 3A and 3B illustrate wiring change patterns at a relay FPC, with FIG. 3A illustrating a read wiring change pattern and FIG. 3B illustrating a write wiring change pattern.
Figure 3B:
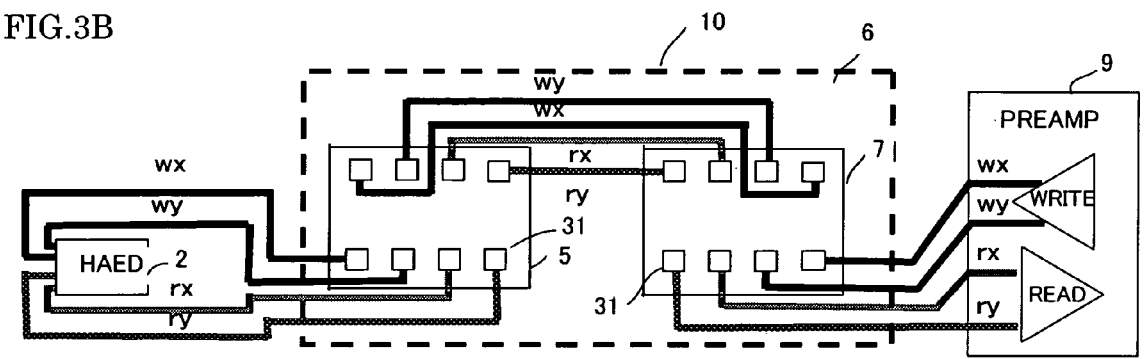

FIGS. 3A and 3B illustrate relay FPC wiring change patterns at the relay FPC.

FIG. 3A illustrates a read wiring change pattern.

In the relay-FPC and RW/FPC connecting portion 7, the polarity of the first read wire rx and the second read wire ry is reversed, and, at the relay-FPC and flexure connecting portion 5, the wiring is one in which the polarity is set back to the original polarity.

In other words, the first read wire rx extending from the preamplifier 9 to the relay-FPC and RW/FPC connecting portion 7 is adjacent to the second write wire wy. However, at the relay-FPC and RW/FPC connecting portion 7, the read wires are reversed, so that, at the relay FPC body 6, the second read wire ry is adjacent to the second write wire wy. At the flexure and relay-FPC connecting portion 5, the read wires are set back to their original positions, so that, at the flexure 4, the first read wire rx is adjacent to the second write wire wy.

More specifically, as illustrated, at the relay FPC body 6, the first write wire wx, the second write wire wy, the second read wire ry, and the first read wire rx are disposed parallel with each other in that order. In contrast, at the flexure and relay-FPC connecting portion 5 and the relay-FPC and RW/FPC connecting portion 7, the connection terminal 31 for the first write wire wx, the connection terminal 31 for the second write wire wy, the connection terminal 31 for the first read wire rx, and the connection terminal 31 for the second read terminal ry are disposed in that order as with the wires extending towards the RW/FPC and the flexure 4 or the head 2 to which the wires are connected.

Accordingly, by disposing the second read wire ry inwardly of the first read wire rx, that is, the first read wire rx outwardly of the second read wire ry and by routing the wires to the connection terminals 31, the wiring can be achieved at the single-layer flexible printed circuit board. Therefore, it is possible to achieve a structure in which the portions of the first read wire rx and the second read wire ry for connection and the portions of the first read wire rx and the second read wire ry at the relay FPC 10 cross each other, so that the polarity of the wires is reversed at the connection portions.

As mentioned above, by using a simple structure which is achieved by changing only a portion of the structure of the connection portions and wiring at the relay FPC 10, it is possible to reverse the polarity of the wires, so that the structure can be achieved at a low cost without changing the design of, for example, the expensive RW/FPC 8, flexure 4, etc.

Although, the embodiment is achieved by the single-layer relay FPC 10, a multilayer relay FPC 10 may be used to reverse the polarity by crossing the wires themselves.

Such wiring is performed due to the following reasons.

Crosstalk at the wires primarily occurs at two locations, that is, at the internal wires of the head 2 and the relay FPC body 6.

More specifically, the relay FPC 10 is disposed along a side surface of the actuator arm 12 from the flexure 4. The width of the side surface is approximately 1 mm, which is very small. Two read wires and write wires, that is, a total of four wires for one head are disposed at this side surface. When both sides of the magnetic disc medium 15 is to be accessed, a total of eight wires, which is equal to the total number of wires for two heads, are disposed. Therefore, the pitch between the wires at the relay FPC 10 is inevitably very small compared to the pitch at other wiring portions. When a heater for controlling the floating amount is mounted to the head 2 in the future, four more wires are needed at most, making the total number of wires equal to 12, thereby further reducing the pitch between wires. Consequently, the wires will tend to be influenced by cross talk.

In addition, since the films of the internal wires of the head 2 are becoming thinner, the influence of crosstalk on the internal portion of the head 2 will become a problem.

First, at the relay FPC body 6, the second read wire ry that is closest to the second write wire wy is greatly influenced by crosstalk electrical current. This is because, since the wire pitch at the relay FPC body 6 is smaller than those at the flexure 4 and the RW/FPC 8, crosstalk tends to occur at the relay FPC body 6 than at the flexure 4 and the RW/FPC 8.

At this time, the crosstalk electrical current tries to flow along the second read wire ry in the direction of the head 2 (see the broken arrow in FIG. 2A).

At the internal wires of the head, the first read wire rx, which is disposed directly below the write wire, is greatly influenced by crosstalk. At this time, crosstalk electrical current flows along the first read wire rx in the direction of the head 2.

Therefore, when this electrical current flows to the second read wire ry that is closest to the second write wire wy at the relay FPC body 6, this electrical current flows in the direction of the preamplifier 9.

As a result, at the relay FPC body 6, the crosstalk electrical current from the transmission path tries to flow in the direction of the head 2, while the crosstalk electrical current generated in the head 2 tries to flow in the direction of the preamplifier 9, so that the crosstalk electrical currents cancel each other out, thereby making it possible to reduce the crosstalk electrical current.

Moreover, when the relay FPC 10 where crosstalk electrical current tends to be generated is provided with such a structure, it is possible to efficiently reduce the crosstalk electrical current.

FIG. 3B illustrates a write wiring change pattern.

Wiring is performed so that, at the relay FPC and RW/FPC connecting portion 7, the polarity of the first write wire wx and the second write wire wy is reversed, and so that, at the relay-FPC and flexure connecting portion 5, the polarity of the wires is set back to the original polarity.

In other words, from the preamplifier 9 to the relay-FPC and RW/FPC connecting portion 7, the second write wire wy is adjacent to the first read wire rx. However, at the relay-FPC and RW/FPC connecting portion 7, the write wires are reversed, so that, at the relay FPC body 6, the first write wire wx is adjacent to the first read wire rx. Then, at the flexure and relay-FPC connecting portion 5, the write wires wx and wy are set back to their original positions, so that, at the flexure 4, the second write wire wy is adjacent to the first read wire rx.

More specifically, as illustrated, at the relay FPC body 6, the second write wire wy, the first write wire wx, the first read wire rx, and the second read wire ry are disposed parallel with each other in that order. In contrast, at the flexure and relay-FPC connecting portion 5 and the relay-FPC and RW/FPC connecting portion 7, the connection terminal 31 for the first write wire wx, the connection terminal 31 for the second write wire wy, the connection terminal 31 for the first read wire rx, and the connection terminal 31 for the second read terminal ry are disposed in that order as with the wires extending towards the RW/FPC 8 and the flexure 4 or the head 2 to which the wires are connected. Accordingly, by disposing the first write wire wx inwardly of the second write wire wy, that is, the second write wire wy outwardly of the first write wire wx and by routing the wires to the connection terminals 31, the wiring can be achieved at the single-layer flexible printed circuit board. Therefore, it is possible to achieve a structure in which the portions of the first write wire wx and the second write wire wy for connection and the portions of the first write wire wx and the second write wire wy at the relay FPC 10 cross each other, so that the polarity of the wires is reversed at the connection portions.

As mentioned above, by using a simple structure which is achieved by changing only a portion of the structure of the connection portions and wiring at the relay FPC 10, it is possible to reverse the polarity of the wires, so that the structure can be achieved at a low cost without changing the design of, for example, the expensive RW/FPC 8, flexure 4, etc. Obviously, the structure of the RW/FPC 8, the flexure 4, or other components, instead of the structure of the relay FPC 10, may be similarly changed.

Crosstalk at the wires primarily occurs at two locations, that is, at the internal wires of the head 2 and the relay FPC body 6.

First, at the relay FPC body 6, the first read wire rx that is closest to the first write wire wx is greatly influenced by crosstalk electrical current. At this time, the crosstalk electrical current tries to flow along the first read wire rx in the direction of the preamplifier 9 (see the broken arrow in FIG. 2B).

At the internal wires of the head, the first read wire rx, which is disposed directly below the write wire, is greatly influenced by crosstalk. At this time, the crosstalk electrical current flows along the first read wire rx to the second read wire ry through the head 2.

As a result, at the relay FPC body 6, the crosstalk electrical current from the transmission path tries to flow in the direction of the amplifier 9, while the crosstalk electrical current generated in the head 2 tries to flow in the direction of the head, so that the crosstalk electrical currents cancel each other out, thereby making it possible to reduce the crosstalk electrical current.

Figure 4A:
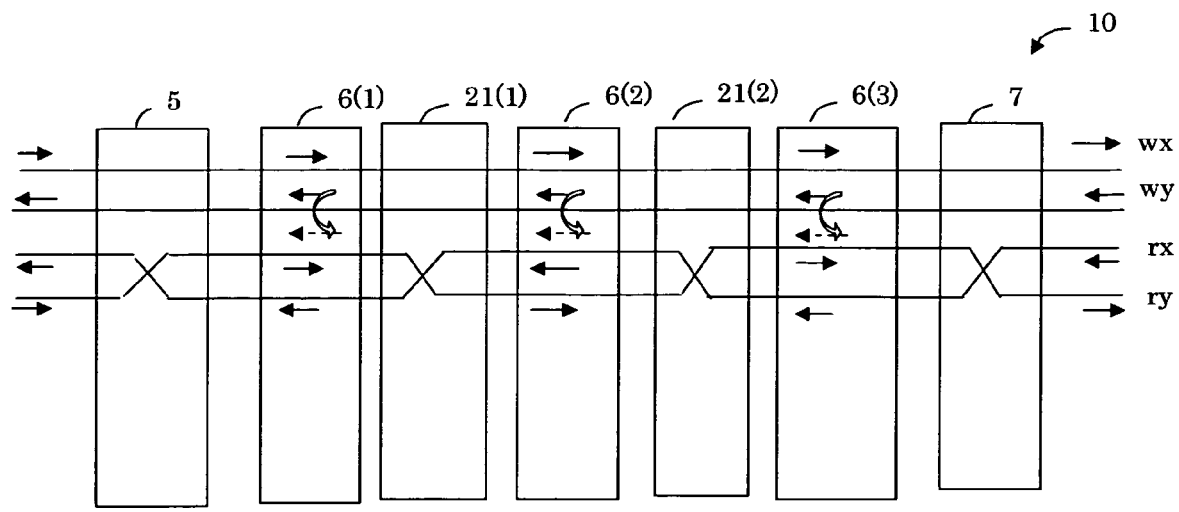
FIGS. 4A and 4B illustrate wiring change patterns in a magnetic head driving device according to a second embodiment of the present invention, with FIG. 4A illustrating a read wiring change pattern and FIG. 4B illustrating a write wiring change pattern.
Figure 4B:
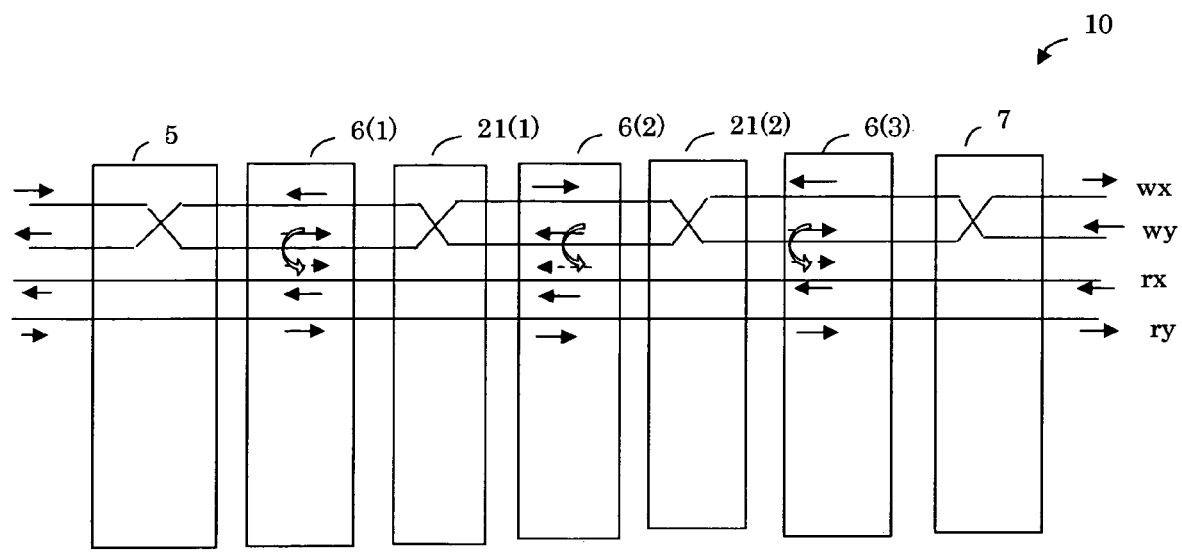

FIGS. 4A and 4B illustrate wiring change patterns in a magnetic head driving device according to a second embodiment of the present invention.

Symbols wx and wy represent a first write wire and a second write wire, respectively. Symbols rx and ry represent a first read wire and a second read wire, respectively. The arrows indicate the directions of electrical current flow.

In a third method for reducing crosstalk, since the quantity of crosstalk electrical current in a head 2 and the quantity of crosstalk electrical current in a transmission path are not necessarily the same, the total length of wiring portions where the polarity of either of the parallel write wires and the parallel read wires is reversed with respect to the polarity of the other of the write wires and the read wires is adjusted in order to equalize the quantity of crosstalk electrical current in the head and the quantity of crosstalk electrical current in the transmission path, so that the quantity of crosstalk electrical current is made as small as possible.

However, since it is difficult to adjust the quantity of crosstalk electrical current in the head, the quantity of crosstalk electrical current in the transmission path is adjusted.

FIG. 4A illustrates a read wiring change pattern.

More specifically, by disposing a plurality of relay FPC bodies 6, the polarity of the read wires is alternately reversed. For example, at a relay-FPC and flexure connecting portion 5 connecting a first relay FPC body 6(1) and a flexure 4 to each other, the polarity of the read wires is reversed. Next, at a relay flexible printed circuit board 21 (hereafter referred to as "relay FPC connecting portion 21)(1) connecting the first relay FPC body 6(1) and a second relay FPC body 6(2), the polarity of the read wires is set back to the original polarity. Then, at a relay FPC connecting portion 21(2) connecting the second relay FPC body 6(2) and a third relay FPC body 6(3), wiring is performed so that the polarity of the read wires is reversed. Next, at a relay-FPC and RW/FPC connecting portion 7 connecting the third relay FPC body 6(3) and an RW/FPC 8, wiring is performed so that the polarity of the read wires is set back to the original polarity. This reduces the patterns that are disposed parallel with each other, so that the amount of crosstalk can be adjusted.

FIG. 4B illustrates a write wiring change pattern.

More specifically, by disposing the plurality of relay FPC bodies 6, the polarity of the write wires is alternately reversed. For example, at the relay-FPC and flexure connecting portion 5 connecting the first relay FPC body 6(1) and the flexure 4 to each other, the polarity of the write wires is reversed. Next, at the relay FPC connecting portion 21(1) connecting the first relay FPC body 6(1) and the second relay FPC body 6(2), the polarity of the write wires is set back to the original polarity. Next, at the relay FPC connecting portion 21(2) connecting the second relay FPC body 6(2) and the third relay FPC 6(3), wiring is performed so that the polarity of the write wires is reversed. Next, at the relay-FPC and RW/FPC connecting portion 7 connecting the third relay FPC body 6(3) and the RW/FPC 8, wiring is performed so that the polarity of the write wires is set back to the original polarity. This reduces the patterns that are disposed parallel with each other, so that the amount of crosstalk can be adjusted.

Figure 5:
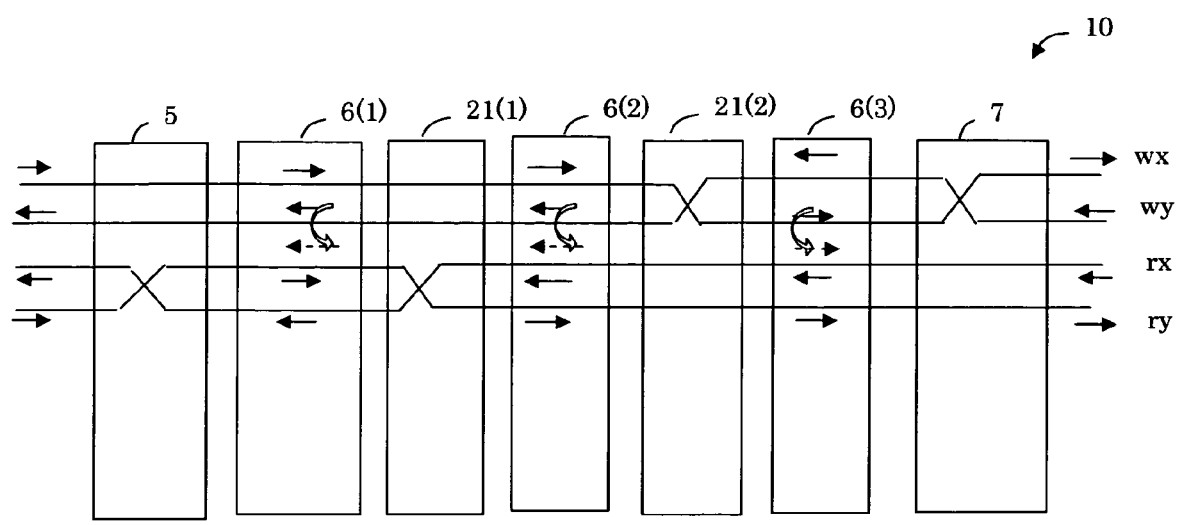
FIG. 5 illustrates a wiring pattern in a magnetic head driving device according to a third embodiment of the present invention.

FIG. 5 illustrates a wiring pattern in a magnetic head driving device according to a third embodiment of the present invention.

Symbols wx and wy represent a first write wire and a second write wire, respectively. Symbols rx and ry represent a first read wire and a second read wire, respectively. The arrows indicate the directions of electrical current flow.

In a fourth method for reducing crosstalk also, the total length of wiring portions where the polarity of either of the parallel write wires and the parallel read wires is reversed with respect to the polarity of the other of the write wires and the read wires is adjusted in order to equalize the quantity of crosstalk electrical current in a head and the quantity of crosstalk electrical current in a transmission path, so that the quantity of crosstalk electrical current is made as small as possible. Accordingly, the fourth method is a method which alternately reverses the polarity of the read wires and the polarity of the write wires by using a plurality of relay FPC bodies 6. For example, at a relay-FPC and flexure connecting portion 5 connecting a first relay FPC body 6(1) and a flexure 4 to each other, the polarity of the read wires is reversed. Next, at a relay FPC connecting portion 21(1) connecting the first relay FPC body 6(1) and a second relay FPC body 6(2), the polarity of the read wires is set back to the original polarity. Next, at a relay FPC connecting portion 21(2) connecting the second relay FPC body 6(2) and a third relay FPC body 6(3), wiring is performed so that the polarity of the write wires is reversed. Next, at a relay-FPC and RW/FPC connecting portion 7 connecting the third relay FPC body 6(3) and an RW/FPC 8, wiring is performed so that the polarity of the write wires is set back to the original polarity.

This reduces the patterns that are disposed parallel with each other, so that the amount of crosstalk can be adjusted.

Here, a model was produced on the basis of the structure of the embodiment shown in FIG. 2A, and the effects of reduction in crosstalk on the basis of simulation and reduction in crosstalk on the basis of actual measurement were determined for such a model wiring.

Figure 7A:
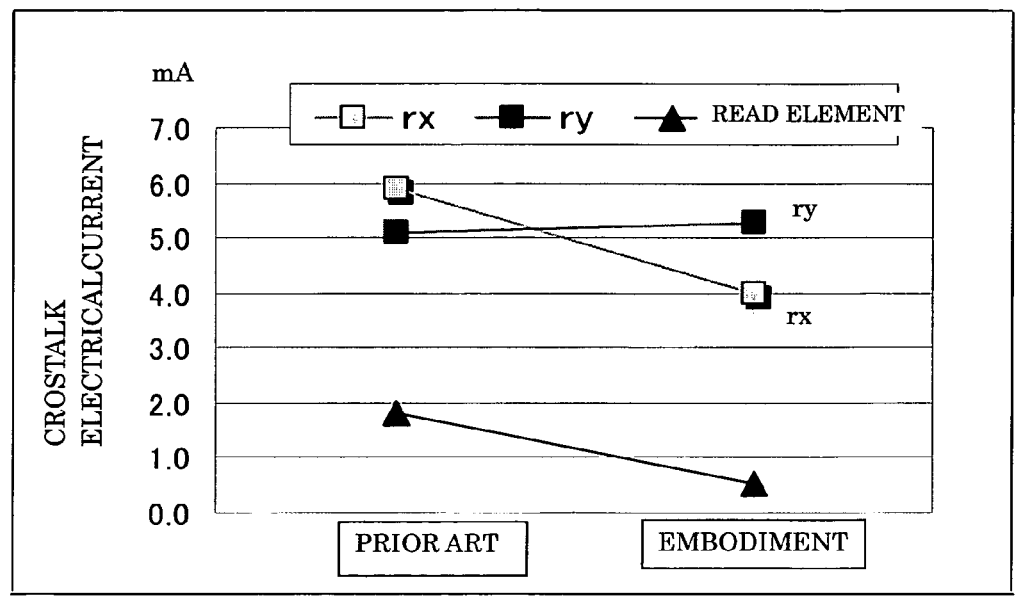
FIGS. 7A and 7B are graphs comparing crosstalk electrical current in related method and in the embodiment according to the present invention, with FIG. 7A showing simulation results of crosstalk electrical current and FIG. 7B showing results of actual measurement of crosstalk electrical current.
Figure 7B:
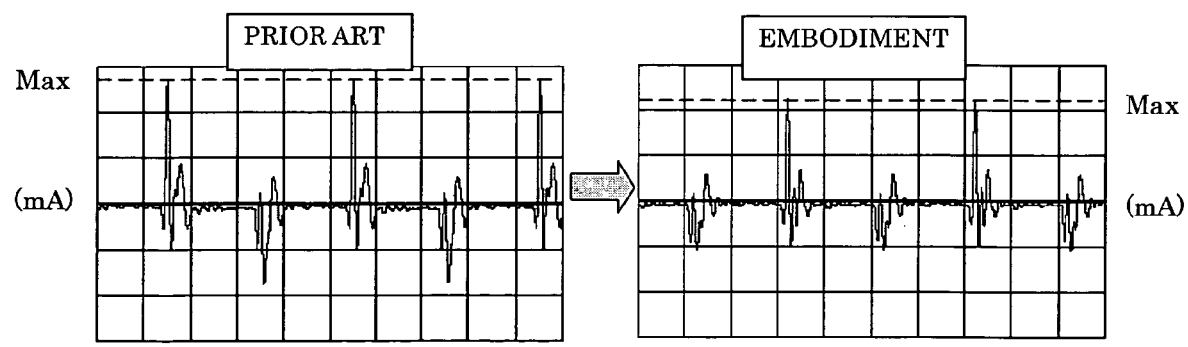

FIGS. 7A and 7B are graphs comparing a related method and the embodiment according to the present invention in terms of crosstalk electrical current.

FIG. 7A shows simulation results of crosstalk electrical current.

The graph is a plot of the simulation results of maximum crosstalk electrical current flowing through a read element and a first read wire rx and a second read wire ry in a transmission path near a head 2. Comparing the related method and the embodiment, near the head 2, since the second read wire ry is not disposed adjacent to a write wire, there is no change in the crosstalk electrical current. However, since the first read wire rx is disposed adjacent to the write wire, the crosstalk electrical current is reduced. In addition, at the read element, the crosstalk electrical current is reduced to at least half of the crosstalk electrical current in the related method. Therefore, it is confirmed that the embodiment is effective in reducing the crosstalk electrical current.

Further, as shown in FIG. 7B, the results of actual measurement of portions of the wires allowed confirmation of the fact that the maximum crosstalk current flowing in the wires in the embodiment having the structure shown in FIG. 2A is less than the maximum crosstalk electrical current flowing in the wires in the related method by approximately 1 mA.

Since the electrical current flowing through the MR element is as a read wire on the order of a few hundred µA, a reduction in the crosstalk electrical current by even approximately 1 mA is huge. Accordingly, it is confirmed that this reduction value does not allow an allowable element breakage value to be easily reached. From these results, it is possible to achieve a wiring in which crosstalk electrical current produced by a write electrical current flowing to the read wires and the read element can be reduced by canceling it by the crosstalk electrical current generated in the head. As a result, since stress applied to the read element is reduced, it is possible to prevent deterioration and breakage of the read element and to increase the life and reliability of the storage apparatus.

In the magnetic head driving device 1 according to the present invention, the parts, such as the flexure 4, the relay FPC 10, and the RW/FPC 8 (main printed circuit board), at the transmission path from the read element and the write element of the recording/reproducing head 2 to the driving circuit are individual parts or are combined.

As mentioned above, reducing crosstalk electrical current produced by write electrical current flowing to the read wires or the read element makes it possible to reduce the crosstalk electrical current flowing into the read element. Therefore, it is possible to prevent deterioration and breakage of the read element and to increase the life and reliability of the magnetic head driving device and the storage apparatus.

In addition, by providing locations where the polarity of the read wires or the write wires is reversed at the relay flexible printed circuit board where crosstalk electrical current tends to be produced, it is possible to reduce the electrical current crosstalk by a simple structure.

What is claimed is:

1. A storage apparatus comprising:
   a recording/reproducing head including a write element and a magnetoresistive element;
   a driving circuit for driving the write element and the magnetoresistive element;
   write wires and read wires for connecting the recording/reproducing head to the driving circuit, said write wires and read wires being disposed in parallel in at least a portion between the recording/reproducing head and the driving circuit; and
   a connection portion for reversing polarity of one of the write wires and read wires with respect to polarity of the other of the write wires and the read wires at a location between the recording/reproducing head and the driving circuit, wherein the total length of the read wires that the polarity reverses to the polarity of the write wires is adjusted so that crosstalk electrical current, caused by both the write element and the write wires, flowing into the magnetoresistive element is reduced within an allowable electrical current value of the magnetoresistive element.

2. The storage apparatus according to claim 1, wherein the write wires and the read wires are disposed at a flexible printed circuit board on which the driving circuit is disposed and at a relay flexible printed circuit board, the relay flexible printed circuit board has the connection portion which further connects the read wires at the relay flexible printed circuit board to the read wires at the flexible printed circuit board and connects the write wires at the relay flexible printed circuit board to the write wires at the flexible printed circuit board.

3. The storage apparatus according to claim 2, wherein the write wires and the read wires are disposed at a flexure on which the recording/reproducing head is disposed and at the relay flexible printed circuit board, the relay flexible printed circuit board has the connection portion which further connects the read wires at the relay flexible printed circuit board to the read wires at the flexure and connects the write wires at the relay flexible printed circuit board to the write wires at the flexure.

4. The storage apparatus according to claim 1, wherein the write wires and the read wires are disposed at a flexure on which the recording/reproducing head is disposed and at a relay flexible printed circuit board, the relay flexible printed circuit board has the connection portion which further connects the read wires at the relay flexible printed circuit board to the read wires at the flexure and connects the write wires at the relay flexible printed circuit board to the write wires at the flexure.

5. A magnetic head driving device comprising:
   a recording/reproducing head including a write element and a magnetoresistive element;
   a driving circuit for driving the write element and the magnetoresistive element;
   write wires and read wires for connecting the write element and the magnetoresistive element of the recording/reproducing head to the driving circuit, said write wires and read wires being disposed in parallel in at least a portion between the recording/reproducing head and the driving circuit; and
   a connection portion for reversing polarity of one of the write wires and read wires with respect to polarity of the other of the write wires and the read wires at a location between the recording/reproducing head and the driving circuit,
   wherein the total length of the read wires that the polarity reverses to the polarity of the write wires is adjusted so that crosstalk electrical current, caused by both the write element and the write wires, flowing into the magnetoresistive element is reduced within an allowable electrical current value of the magnetoresistive element.

6. The magnetic head driving device according to claim 5, wherein the write wires and the read wires are disposed at a flexible printed circuit board on which the driving circuit is disposed and at a relay flexible printed circuit board, the relay flexible printed circuit board has the connection portion which further connects the read wires at the relay flexible printed circuit board to the read wires at the flexible printed circuit board and connects the write wires at the relay flexible printed circuit board to the write wires at the flexible printed circuit board.

7. The magnetic head driving device according to claim 6, wherein the write wires and the read wires are disposed at a flexure on which the recording/reproducing head is disposed and at the relay flexible printed circuit board, the relay flexible printed circuit board has the connection portion which further connects the read wires at the relay flexible printed circuit board to the read wires at the flexure and connect the write wires at the relay flexible printed circuit board to the write wires at the flexure.

8. The magnetic head driving device according to claim 5, wherein the write wires and the read wires are disposed at a flexure on which the recording/reproducing head is disposed and at a relay flexible printed circuit board, the relay flexible printed circuit board has the connection portion which further connects the read wires at the relay flexible printed circuit board to the read wires at the flexure and connects the write wires at the relay flexible printed circuit board to the write wires at the flexure.

* * * * *